United States Patent [19]
Britton

[11] Patent Number: 6,040,770
[45] Date of Patent: Mar. 21, 2000

[54] COMMUNICATION PATH INTEGRITY SUPERVISION IN A NETWORK SYSTEM FOR AUTOMATIC ALARM DATA COMMUNICATION

[76] Inventor: Rick A. Britton, 3319 S. Saratoga, Springfield, Mo. 65804

[21] Appl. No.: 09/148,438

[22] Filed: Sep. 4, 1998

Related U.S. Application Data

[60] Provisional application No. 60/057,940, Sep. 5, 1997.
[51] Int. Cl.[7] ...................................................... G08B 1/08
[52] U.S. Cl. .......................... 340/539; 340/506; 340/514; 340/516
[58] Field of Search ..................................... 340/506, 507, 340/505, 825.52, 286.02, 511, 514, 516, 825.06, 825.07, 825.08

[56] References Cited

U.S. PATENT DOCUMENTS

| | | |
|---|---|---|
| 4,371,751 | 2/1983 | Hilligoss, Jr. et al. .................. 179/5 R |
| 4,772,876 | 9/1988 | Laud ....................................... 340/539 |
| 4,791,658 | 12/1988 | Simon et al. ............................. 379/41 |
| 4,825,457 | 4/1989 | Lebowitz .................................. 379/40 |
| 5,125,021 | 6/1992 | Lebowitz .................................. 379/40 |
| 5,140,308 | 8/1992 | Tanaka .................................... 340/539 |
| 5,146,486 | 9/1992 | Lebowitz .................................. 379/40 |
| 5,185,779 | 2/1993 | Dop et al. ................................. 379/33 |
| 5,337,342 | 8/1994 | Kruger et al. ............................ 379/40 |
| 5,365,568 | 11/1994 | Gilbert ..................................... 379/43 |
| 5,454,024 | 9/1995 | Lebowitz .................................. 379/40 |

*Primary Examiner*—Daryl Pope
*Attorney, Agent, or Firm*—Jonathan A. Bay

[57] ABSTRACT

A communication path integrity supervision system is provided in a network system that allows communication of automatic alarm data. This involves a network, needless to say, in which a plurality of automatic alarm data transmitters are linked by diverse paths with at at least one central receiver on the network for receiving the automatic alarm data. In this integrity supervision system, the responsibility for carrying out the integrity supervision functions have been largely shifted onto the remote transmitters—each responsible for its own path or paths—and shifted away from the central receiver to the extent required by the prior art "receiver-polling" protocol. That is, each transmitter includes circuits for generating and sending to the central receiver a succession of "next promised check-in" messages, to be on schedule as promised. The central receiver responds to the reception of each such message by updating a table of such messages, scheduling or rescheduling the promised occurrence for the next check-in message as applicable to that particular remote transmitter. The central receiver is further configured with an alert signal for signaling whenever any remote transmitter fails to meet its scheduled or rescheduled next promised check-in. Given the foregoing, the integrity of the communication paths are supervised.

17 Claims, 3 Drawing Sheets

COMMUNICATION PATH INTEGRITY SUPERVISION IN A NETWORK SYSTEM FOR AUTOMATIC ALARM DATA COMMUNICATION

CROSS REFERENCE TO PROVISIONAL APPLICATION(S)

This application claims the benefit of U.S. Provisional Application No. 60/057,940, filed September 5, 1997.

BACKGROUND OF THE INVENTION

1. Field of the Invention

The invention relates to automatic, premise-monitoring alarm systems such as for example burglary or burglary/fire alarm systems, and more particularly to a system for supervising the integrity of the communication path(s) that carry the alarm message data between a central alarm-message receiving station and a network of remotely-located, automatic, premise-monitoring alarm systems.

2. Prior Art

Premise-monitoring alarm systems monitor a given protected premise—say, for example, a residential home, a jewelry store, a shoe store, a bank vault, or an ATM machine and the like—for the occurrence of a given alarm event:—e.g., an unwanted intrusion, unauthorized entry or smoke and so on. Some alarm events simply correspond to a "low battery" condition in the protected-premise control unit or panel. Upon detection of a given alarm event, the automatic alarm system signals the alarm event to a central alarm-monitoring station. The central alarm-monitoring station, which may be a public or private service, may manually process the signal by an attendant who can dispatch police or fire-fighters or alert the store-owners or take whatever other steps are appropriate. Prior art automatic alarm systems have typically operated over standard voice-grade telephone lines.

It has been a problem that if the telephone line is cut or otherwise drops out of service, then the protected premise is isolated from the central alarm monitoring station, and is without means to even signal the loss of the telephone line. Indeed the central alarm monitoring station greatly desires a signal that corresponds to or indicates the loss of the telephone link between itself and the protected premise, as that is an alarm event in itself.

There are prior art systems which address this problem of loss of telephone service (or a communication link) between the protected premise and the central alarm monitoring station. As will be described further below, the prior art systems incorporate various techniques for supervising the integrity of the telephone (or communication) link. There are also, however, various shortcomings associated with the prior art systems as will also be described below. Accordingly, it is an object of the invention to overcome the shortcomings of the prior art and provide improved, communication path integrity supervision in a network system for automatic alarm data communication.

SUMMARY OF THE INVENTION

These and other aspects and objects are provided according to the invention in a communication path integrity supervision system in a network system for automatic alarm data communication. In accordance with one format of the invention, the integrity supervision system comprises the following. There is a "check-in message" receiving center which is provided with computer memory for storing check-in schedules. There is a network of diverse communication paths linked to the center. And there are also a plurality of remote, automatic alarm-data communicators that are communicative with the center over the diverse paths.

Each remote communicator is given means for generating and sending successive "next promised check-in" messages, on schedule as promised. The center responds to the reception of each such message by updating the memory, scheduling or rescheduling the next promised check-in for that remote communicator. The center is further configured with alerting means for alerting instances when any remote communicator fails to meet its scheduled or rescheduled next promised check-in.

These remote communicators are characteristic of a protected-premise alarm panel and are combined with circuitry including alarm-event sensors for generating data responsive to detection of alarm events. Each remote communicator includes means for encoding the "next promised check-in" message with a time factor that corresponds to the timeliness of the reception due for the next promised check-in for that communicator. Underlying the communication between the center and the remote communicators is a protocol shared by them as regards the time factor. That is, the protocol recognizes both (i) a set of values signifying intervals of time as well as (ii) a null factor signifying that the sending communicator wishes to check or sign off from the system. Hence the alerting means will no longer apply or act on failures to timely respond in reference to that particular communicator.

The alerting means responds to instances when any remote communicator fails to meet its scheduled or rescheduled next promised check-in, by producing an alert signal, which may be acted on by an attendant of the message receiving station The diverse communication paths can be alternatively any of the following:—eg., they can comprise a substantially homogenous network of cables (either conductors or fiber optic), or a substantially homogenous network of radio links, or a conglomerate network including both cables and radio links. Also, the memory for the check-in message receiving center preferably is configured with a table data structure for tabulating communicators against their next promised check-in schedule.

Another format of the invention might comprise the following aspects. It might have a network of communication paths as before, as well as a plurality of remote, automatic alarm data communicators linked to the network. There then might be at least one monitoring station communicative with the remote communicators over the network.

Each remote communicator would have means for dispatching successive "next check-in" messages, including timing means for timing the timeliness of the dispatch of each succeeding "next check-in" message. The at least one monitoring station would have memory and would also respond to reception of each such message by setting or resetting in the memory an appointed "next check-in" time for that remote communicator. Moreover, the at least one monitoring station would have a monitoring means for monitoring the appointed next check-in times in the memory for instances of failure to receive from any remote communicator a timely succeeding "next check-in" message.

Each remote communicator includes means for encoding the "next check-in" message with a time factor that allows monitoring for the appointed time by which reception is due for the succeeding next check-in from that communicator.

The timing means is configured to dispatch each succeeding "next check-in" message about a minute before such lapse of the interval of time that was signified by the preceding "next check-in" message.

In accordance with an alternative format of the invention (wherein the formats presented here are exemplary only and not an exhaustive depletion of all the formats possible in accordance with this disclosure), a communication path integrity supervision system in a network system for automatic alarm data communication might comprise these next aspects. That is, as before it includes a network of communication paths. There are also a plurality of automatic alarm data transmitters linked to the network. And there is at least one receiver on the network for receiving the automatic alarm data.

Each transmitter includes a "check-in" means for generating and sending discrete series of "check-in" messages chosen from a group including:

a first message for any such series, a last message of such series, and at least zero intermediate messages bracketed therebetween.

Wherein, each "check-in" message is encoded with a time parameter which expresses a timeliness factor for the succeeding message in the series. The receiver has computer memory and it also responds to reception of any first check-in message from a given transmitter by storing in memory the time parameter therefor. The receiver responds to any timely received intermediate message by updating in memory the new time parameter therefor. The receiver further has a monitoring function for monitoring the stored check-in parameters given only by first and intermediate check-in messages from any transmitter for instances of failure to receive from such transmitter a timely succeeding "check-in" message.

On the other hand, the receiver responds to reception of any last message in a series from a given transmitter by nullifying the monitoring function as applied to that given transmitter, until the reception of a next first check-in message from that given transmitter after a period of dormancy.

The check-in means is configured to send each succeeding intermediate or last "check-in" message about a minute before expiration of the timeliness factor for that succeeding "check-in" message. The check-in means also allows configuration with plural modes for choosing and assigning a time parameter to encode in each first or succeeding intermediate "check-in" message. In accordance with one such one mode, it causes assignment of time parameter corresponding to regularly spaced time intervals. And in accordance with the other such mode, it causes assignment of randomly chosen time intervals ranging between a value greater than zero and a larger value which is finite. In a preferred embodiment, this translates to values between two (2) and sixty (60) minutes.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
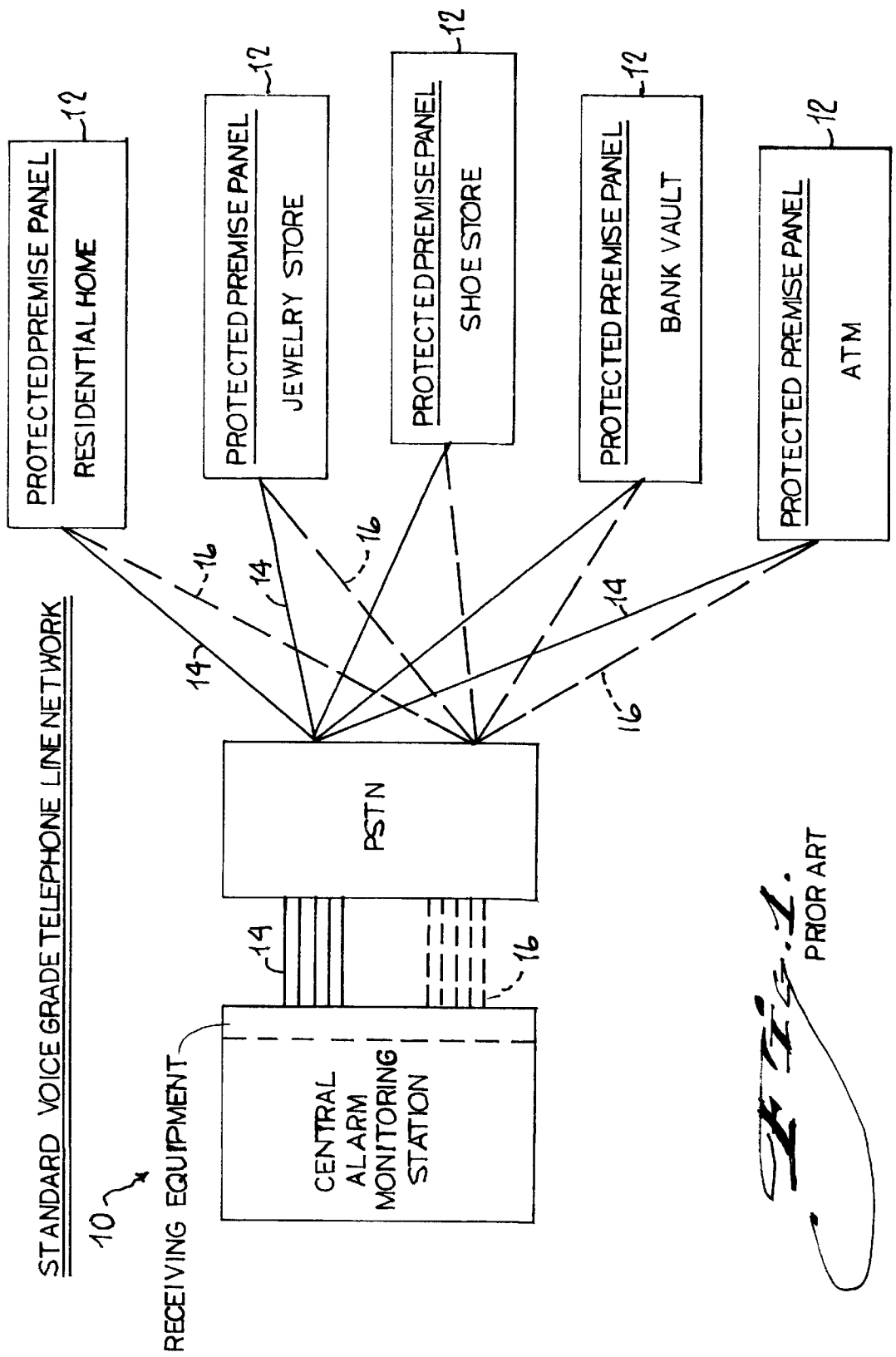
FIG. 1 is a diagrammatic view of a standard voice-grade telephone line network in accordance with the prior art for handling signals of automatic alarm systems.

FIG. 1 shows a standard voice-grade telephone line network 10 in accordance with the prior art for handling transmission of automatic alarm system signals. The network comprises a central alarm monitoring station which may be a public or private service. The central alarm monitoring station has various subscriber sites 12 to which it provides its alarm monitoring services. These sites or protected premises can include without limitation a residential home, a jewelry store, a shoe store, a bank vault, a bank ATM machine, and so on. The central alarm monitoring station is likely to service concurrently thousands upon thousands of subscriber sites. In FIG. 1, communication between the central station and each protected premise is accomplished by standard voice grade telephone lines that extend over a public switched telephone network (PSTN). Example automatic alarm systems operating over standard voice grade telephone lines are shown by U.S. Pat. No. 4,371,751—Hilligoss, Jr. et al., U.S. Pat. No. 4,791,658—Simon et al., and U.S. Pat. No. 5,365,568 —Gilbert, the disclosures of which are incorporated in full by this reference to them.

Each protected premise has a control unit or panel that interfaces between the central alarm monitoring station and various alarm sensors on the premises (e.g., smoke detectors, motion detectors, open-entry detectors and so on, not shown). Each protected premise panel is connected to the PSTN at least by one telephone line 14 indicated in the drawing in a solid line. If that one line 14 is cut or telephone service should drop out, the central alarm monitoring station could never determine what incoming calls it missed from any given protected premise.

One prior art solution has been the extension of a second or secondary line 16 to each protected premise, and these secondary lines are indicated in dashed lines in the drawing. The central alarm monitoring station sends a direct current or tone over the secondary line 16 to monitor the integrity of the one line 14. This is one example of what is called in the industry "supervising" the communication path. If for example, the phone service dropped out locally for the jewelry store only (while phone service remained intact for the rest of the protected premises shown by FIG. 1), the central alarm monitoring station would detect an open circuit condition on the line 16 to the jewelry store carrying the direct current. The open circuit condition would alert the central alarm monitoring station to the fact that it had lost communication with the jewelry store. Hence the central alarm monitoring station would likely take some corrective action like alert the store owners or management so that the owners or management could post a night watchman or the like, especially if the risk of loss from burglary would justify the trouble and cost.

One shortcoming of extending a second line 16 to each protected premise is the cost of all those additional thousands of leased lines 16. Another shortcoming was how complex it made the handling of all those lines 14 and 16 at the central alarm monitoring station. There is a general term used by the industry to describe the interface equipment at the central alarm monitoring station for interfacing with the communication path, and that general term is "receiving equipment." With all those thousands of incoming lines 14 for each protected premise, and the redundant line 16 as well for each protected premise, the receiving equipment sometimes comprised massive terminal boards (not shown) for interconnection of all those lines 14 and 16.

More significantly, not only did the receiving equipment at the central alarm monitoring station have to be configured with special hardware to handle this direct-current protocol of supervising the network, but more significantly, the receiving equipment furthermore had to be configured with a special software package. These kinds of systems exist today and teams of operator/managers are required by the central alarm monitoring station to maintain this software package. This is because, the software package must be installed with a list of which all protected premises are "ON" the network, including the corresponding sets of electronic addresses (eg., telephone numbers cases of PSTN lines) for each such protected premise. Such a list must be continually updated, under the attention of the operator/managers. If a new subscribing protected premise wishes to get added to the network, the operator/managers must attend to creating a record for the new subscriber in the list in the software package. If a subscribing protect premises wishes to cancel its subscription to the network, the operator/managers must attend to deleting the record for the canceling subscriber in the list in the software package. If a subscribing protect premise is merely going to drop off the network for a short time as for service to the alarm system, the operator/managers have to be notified in advance to attend to flagging that condition in the software package in order to prevent errant alarm detection with that protected premise.

Given the foregoing, we be reckon that for a large-scale central alarm monitoring station, it occupies a sizable team of operator/managers and technicians to handle the responsibilities of continually juggling the hardware connections and/or updating the subscriber lists in the software package.

Figure 2:
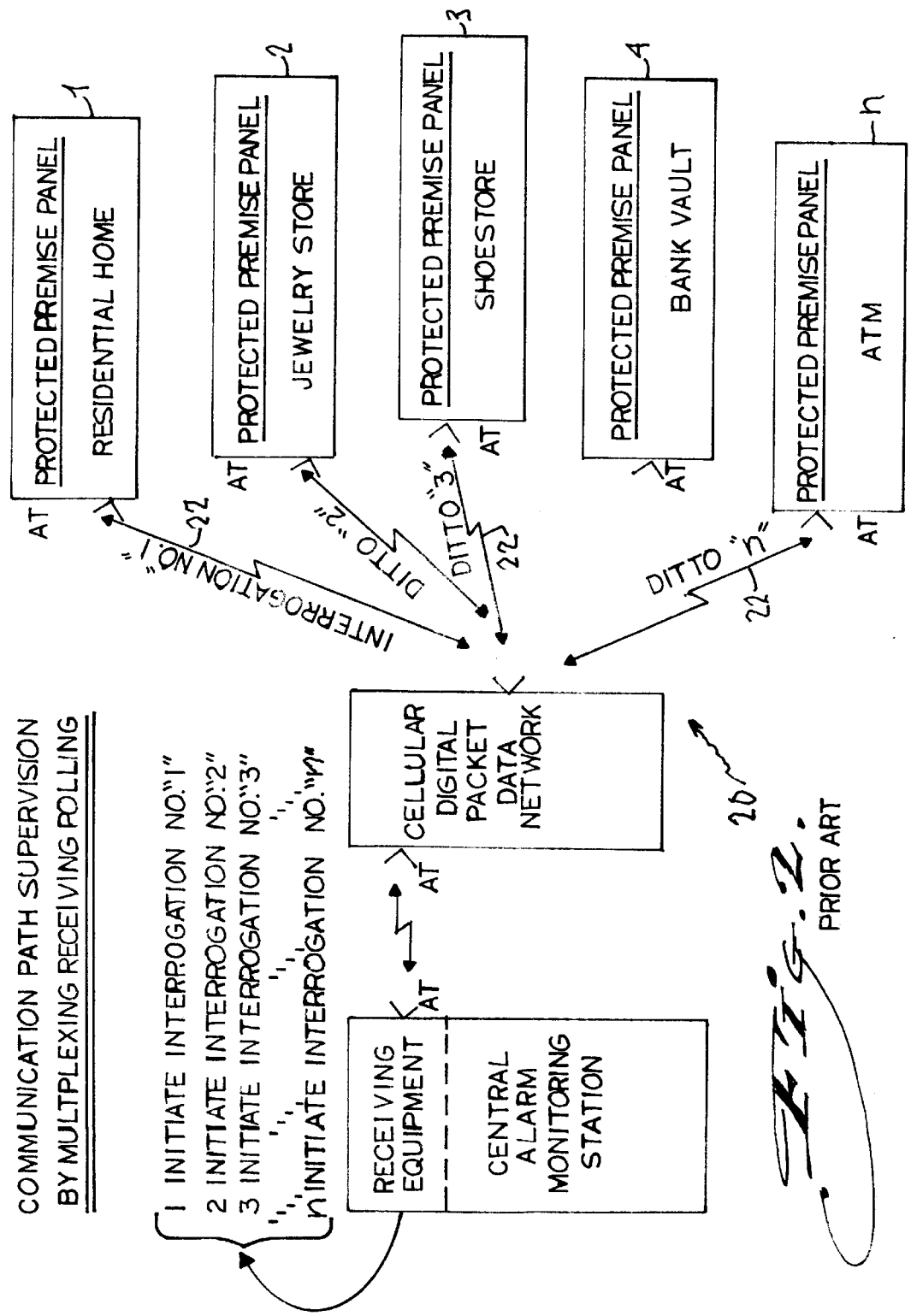
FIG. 2 is a diagrammatic view of communication path supervision in accordance with the prior art by means of the receiving equipment in the central alarm monitoring station multiplexing or polling the various protected premise panels; and, FIG. 3 is a diagrammatic view of communication path integrity supervision in accordance with the invention in a network system for automatic alarm data communication.

The direct-current supervision protocol shown by FIG. 1 eventually fell out of favor in the alarm monitoring industry, in favor instead for what is shown by FIG. 2.

FIG. 2 shows a network system 20 for handling automatic alarm signals in which the primary communication link between the central alarm monitoring station and the subscriber sites extends over a cellular network. Typically there exists a back-up channel (not shown) for use in cases when the primary cellular link is lost, and most often the back-up channel is voice-grade landlines handled by a PSTN (not shown in FIG. 2, but see FIG. 1 for a diagrammatic depiction of a conventional PSTN arrangement).

With continued reference to FIG. 2, the central alarm monitoring station has receiving equipment which can send and receive data messages over the cellular network destined for and received from each protected premise panel, which likewise is equipped with suitable cellular transceivers. In the drawings, the designation "AT" indicates antenna. The wireless path between each protected premise and the central alarm monitoring station comprises at least one cellular communication path 22 for each protected premise (again, as in FIG. 1, only a representative sample of five protected premises are shown, and not thousands as is more typical in real cases). These communication paths 22 are subject to occasional failure and so each of these paths needs to be supervised for any compromise.

FIG. 2 diagrammatically shows a multiplexing or "receiver polling" technique for supervising the communication paths 22 integrity. The receiving equipment—by itself or supplemented by additional automation system(s) (none shown) and/or software package(s)—is configured with a listing of all its subscriber sites (i.e., the protected premises in the drawings) and their addresses (e.g., which may be telephone numbers). Communication path supervision is accomplished by the receiving equipment dialing or accessing serially each protected premise on its list, and send it an "interrogation message." The interrogation message might simply be an aural tone.

In use, the receiving equipment initiates "interrogation" messaging by placing a call to (or establishing a communication link with) the first protected premise on its list, or as shown by the drawing, protected premise panel number 1 (i.e., the residential home in the drawing). The protected premise panel 1 at the residential home is configured to respond to the "interrogation" message with a feedback signal indicating that it (protected premise panel no. 1) is operative, or "okay."

The receiving equipment is further configured to hang up or disconnect, and proceed serially down its list to contact protected premise no. 2 (i.e., the jewelry store) with a like "interrogation" message, and panel no. 2 responds with an appropriate feedback signal if it is okay. And so on, to protected premise no. 3, and on through no. "n" of the protected premises, which, upon completing its list, the receiving equipment repeats the foregoing process, starting again with protected premise no. 1.

The "interrogation" message can be more complicated than a tone, but in essence the "interrogation" message corresponds to an inquiry, "address no. 'x,' do you respond?" If there is no satisfactory response, then the central alarm monitoring station follows up with further error checking to detect a compromised communication path.

Hence FIG. 2 depicts what has been termed the "receiver polling" technique of supervising the communication path integrity for a network system carrying automatic alarm data. Even though the method of operation is evident from the foregoing, it will be reviewed briefly as follows, for the sake of clarity.

The central alarm monitoring station has a host computer is configured with a special software package for handling the supervising functions of the network. This special software package is loaded with all the following data. It is loaded with all of the network's cellular telephone numbers with their corresponding electronic serial numbers (ESN's) assigned to the cellular transceivers used to "transmit" the alarm conditions from the subscriber sites, as well as the cellular telephone numbers and ESN's of the transceivers (only one shown, designated AT on the central alarm monitoring station) located at the central alarm monitoring station for the purposes of "receiving" the alarm signals from the subscriber sites. At any given point in time, some fractional number of the subscriber sites loaded into the software package are going to be "bypassed" by the polling functions of the software package. Hence those subscriber sites which are not to be "bypassed" are "flagged" accordingly for monitoring.

Using this special software package, the central alarm monitoring station's host computer constantly scans the entire cellular network to ascertain whether those particular cellular transceivers which are "flagged" in the computer memory are indeed on-line and operable. This is done using the software package to periodically interrogate each of the cellular transceivers being monitored by sending a signal to each and interrogate them:—ie., as by instructing them to "test" themselves (ie., the transceiver) by sending back a special signal. If the special signal is not received from a certain transceiver within an allotted time period, the host computer will recognize that particular cellular transceiver as not being operable and will report this condition to a microprocessor digital receiver that is associated with that particular cellular transceiver that has failed to respond. That microprocessor will take appropriate action as, for example, alerting one of the operator-attendants of the central alarm monitoring station.

Whereas "receiver-polling" as shown by FIG. 2 differs in respects with direct-current monitoring shown by FIG. 1, there is much that is similar in regards to shortcomings. Teams of operators and technicians are required to support the software package's functioning on the host computer as well as the hardwiring of each microprocessor dedicated to each cellular transceiver on the network. The entry of new subscribers, updating the information on old subscriber sites as well as perpetual flagging or un-flagging subscriber sites occupies much time and energy from human resources in order to sustain this "receiver-polling" system.

Figure 3:
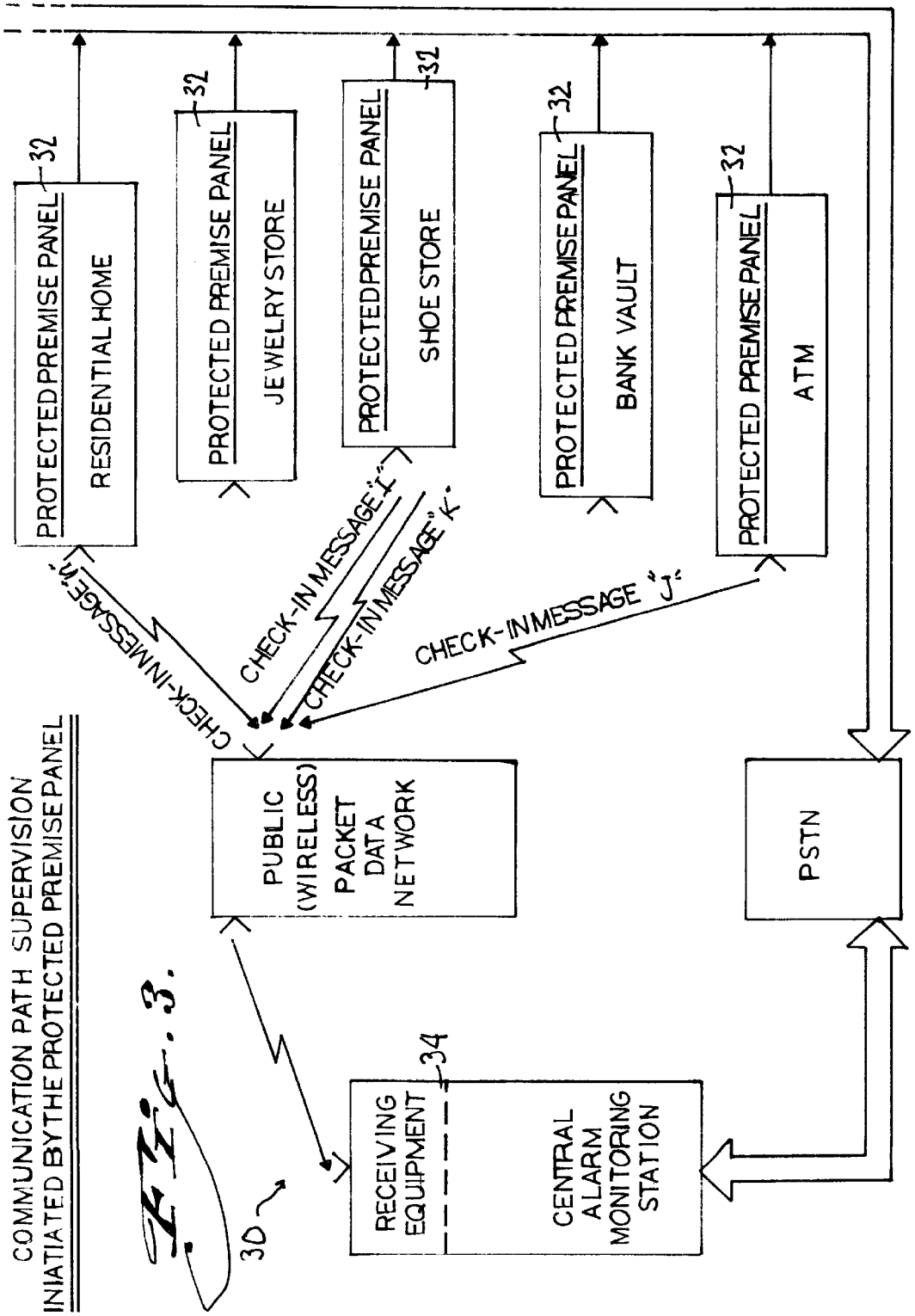

With reference to FIG. 3, communication path integrity supervision 30 in accordance with the invention for a network system of automatic alarm data communication, is accomplished by each of the protected premises dispatching a self-initiated "check-in" message to the receiving equipment, unlike FIG. 2 in which the subscriber sites passively await for interrogation.

As shown by the patent disclosures referenced above (and incorporated herein by reference), conventional protected premise control units or panels have for many years been configured with sufficient "intelligence" to establish a communication link to the central alarm monitoring station, and send alarm signals over that link. Higher level conventional control panels are known to send packet data messages. Packet data messages can include relatively high level content including expressions of exactly which detector is armed or what alarm area is armed and so on. This "intelligence" in the control panel typically resides in programmable processing circuits and/or components as well as associated memory circuits and/or components and the like.

According to the invention, each control panel 32 is further configured or programmed to initiate its own "check-in" messaging to the receiving equipment 34 of the central alarm monitoring station. The FIG. 3 receiving equipment 34 is relatively more passive in its supervisory role over communication path integrity relative to the roles played by the receivers shown by FIGS. 1 and/or 2. The receiving equipment 34 is configured with a table in its memory to tabulate and organize the incoming "check-in" messages. It is not configured, however, to multiplex or poll—eg., or "interrogate"—the protected premises 32 as was described in connection with FIG. 2.

An example configuration of the receiving equipment 34 and protected premise panels 32 for communication path supervision 20 in accordance with the invention can include the following. The network is shown primarily communicating over a public wireless packet data network, although other Wide Area Networks would suffice as the primary communication link including without limitation cellular networks or proprietary fiber optic or conductor cable networks, or also proprietary radio networks or the public switched telephone network (PSTN) and so on. However, use of a public wireless packet data network as shown in the drawing is shown here merely for convenience in this description as a non-limiting example.

Each protected premise panel 32 is configured to initiate its own "check-in" message. The receiving equipment 34 is configured to acknowledge the receipt of the check-in message and store the message contents in a Host Output Specification System Table. An inventive aspect of the "check-in" messaging system 30 in accordance with the invention concerns the message contents of the check-in message. In use, each protected premise panel 32 generates an indefinite succession of "Next Check-In Message(s)." Each Next Check-In Message is designed to test the communication channel between the protected premise panel 32 and receiving equipment 34 for a compromise. The message contents describe to the receiver equipment 34 the number of minutes that will pass before the panel transmits its Next Check-In Message. In effect, the communication channel is supervised by the continual transmission of these messages.

The range of time between Next Check-In Message(s) is determined by panel programming. The preferred choices include the value zero (0) minutes and then extend between extreme values in a range between two (2) and sixty (60) minutes. A choice of a value or interval between two (2) and sixty (60) minutes causes the succeeding Next Check-In Message scheduled to be sent to the receiving equipment 34, to be sent about a minute before the expiration of the chosen interval. The panel 32 must transmit the succeeding Next Check-In Message one (1) minute before the lapse of time of the value of the predecessor Next Check-In Message transmitted to the receiving equipment 34, and whose value was stored in the Host Output Specification System Table.

For example, in consideration of a given protected premise panel, it might operate as follows. It might transmit a Next Check-In Message of six (6) minutes. Five (5) minutes later, it successfully transmits another Next Check-In Message of six (6) minutes. And then, another five (5) minutes later, it successfully transmits still another Next Check-In Message of six (6) minutes, and so on. That is, the panel is programmed to transmit repeated values of six (6) minutes so that upon every five or six minute interval, it checks in with the receiving equipment 34. The receiving equipment 34 processes each successfully received Next Check-In Message by updating the Host Output Specification System Table.

If, however, the receiving equipment 34 fails to receive a scheduled or appointed Next Check-In Message within the proscribed lapse of time, it generates an "alert" signal for that protected premise. The receiver equipment 34 will not generate multiple "alert" signals if it never receives another next Check-In Message. Only the first failure will result in generation of an "alert" signal.

How the "alert" condition is handled by the central alarm monitoring station depends on the given premise. A failure from the jewelry store or bank vault to check-in at night will likely result in police dispatch. For the shoe store it might be a phone call to the owners or managers or some other responsible party, rather than immediately directly involving the police.

What has been described so far has been a Next Check-In Message sequence occurring at regular intervals, and more specifically, at between five (5) and six (6) minute intervals. The foregoing mode of communication path supervision 30 is preferred during nighttime. During daytime, a different mode of communication path supervision 30 is preferred, and the panels 32 can be programmed to switch at dawn and dusk between the different modes as desired.

The preferred daytime mode includes a random value generator to randomly generate a value between two (2) and sixty (60) minutes as the chosen time parameter for any given Next Check-In Message. For example, for a certain panel 32 (it is not important for this example which particular panel 32 is involved), the certain panel might transmit a given Next Check-In Message corresponding to thirty-seven (37) minutes. Accordingly, thirty-six (36) minutes later, this certain panel then attempts to successfully transmit another Next Check-In Message, this time say the random-value-generator parameter is chosen as seventeen (17) minutes. If the transmission of the message corresponding to the value seventeen (17) is properly received by the receiving equipment 34—before the expiration of the thirty-seventh ($37^{th}$) minute—then the integrity of the communication path for that certain panel 32 has been proven. The receiving equipment 34 thus updates the Output Specification System Table with the time value "17 minutes" against the record of that certain panel 32. In time, it can be expected that that certain panel 32 will proceed to transmit a following Next Check-In Message within the scheduled seventeen (17) minute interval, and so on, endlessly, with successive random values chosen from between two (2) and sixty (60) minutes.

If however any area of the panel is armed, the panel switches modes back to the more conservative non-randomly generated value of six (6) minutes only between checking. It is only as long as all areas of the panel are disarmed that the value for the Next Check-In Message can be randomly chosen from between six (6) and sixty (60). The foregoing alternate modes of communication path supervision 30 in accordance with the invention satisfy the requirements of the Underwriters Laboratories for devices of this type.

To get back to the meaning of the zero (0) time value, it means literally that the given protected premise panel 32 will cease transmitting Next Check-In Messages. In other words, the zero (0) or null value allows a protected premise panel to check itself OFF the network. The receiving equipment 34 responds by not generating an alert signal for failure to receive a Next Check-In Message. As said, the zero (0) or null value serves the purpose of allowing any panel 32 to sign off the network without tripping an alert condition. This is especially desirable, for example, during routine maintenance or service. A technician at the subscriber site can take the panel 32 off the network, which is a much simpler process than involved with a "receiver-polling" protocol (ie. FIG. 2). As described above, the process of dropping a panel off a "receiver-polling" network ordinarily requires human intervention at the receiver end.

FIG. 3 shows how the transmission of random value messaging appears on a network. Assume that the protected premise of the shoe store is scheduled to transmit a Next Check-In Message at this instance. Now let's assume that it does so, and let's assign a designation to this Next Check-In Message, the designation "i." So, the Next Check-In Message "i" is transmitted to the receiving equipment 34, and let us assume that the shoe store panel sent a message of eight (8) minutes. Now the next protected premise scheduled to contact the receiving equipment is the ATM machine. And so the ATM machine transmits Next Check-In Message "j" in which the ATM machine recites that its new interval will be thirty-seven (37) minutes. At this point, circumstances would have it that the next panel scheduled to transmit a check-in message is the shoe store again. All the other protected premises had successfully contacted the receiving equipment before the transmission of Next Check-In Message "i," except that they had sent a much higher value of a time interval than eight (8) minutes. Thus they aren't scheduled to contact the receiving equipment 34 for some time yet, but the shoe store is indeed scheduled to go next. Accordingly, it does so, seven (7) minutes after reception of Next Check-In Message "i," and it transmits Next Check-In Message "k."

This example shows that by the random value mode, the various protected premises 32 check in at all different lengths of intervals, in no particular sequence relative to one another, indefinitely, through message number "n" and upwards.

A preferred "Next Check-In Message" format is shown as follows, in hexadecimal units.

```
            1         2
   12345678901234567890123
      09AC    2002 s0700043
      xcccc__aaaaa__mmmmddtt__i
   X = ASCII Start of Text (HEX 02)
   c = CRC
   a = Account Number
   m = System Message
   d = Zero
   t = Time Modifier
   _ = Space
   i = ASCII Carriage Return (HEX 0D)
```

FIG. 3 does show that each protected premise panel 32 is alternatively connected by the public telephone lines or buses (i.e., the PSTN) to the central alarm monitoring station. This gives the protected premise panels 32 a back-up communication path to transmit alarm signals over. The phone lines are also available for transmission of a nightly Recall Test report. In any event, if the phone line is the premise's actual business line, the reservation of the phone line for back-up communication purposes only, or else for brief nightly reports, avoids interfering with that phone line's usage during normal business hours.

Actual usage of this system 30 of communication path supervision, as by having the control panels responsible for periodically checking themselves in with the receiver 34, has proven this system to have great advantages. An example case includes the use of this kind of system by one large national bank. This bank has ATM machines spread out across the country on the order of a thousand or so. This bank also has a private packet data network to handle transmission of internal accounting data as well as e-mail and like business traffic. This network is patched together from a conglomerate of resources including privately owned conductor-cables, leased fiber optic cables, with cellular and even satellite links in places. The amount of business traffic passing over this network far surpasses the traffic handled by the telephone system. So important and substantial is this data network for this bank, that its feelings toward its network can be likened to the feelings recently expressed by chip-manufacturer Intel Corporation. It is said that if Intel Corporation had to choose between taking down the network for half a business day, or its phone lines, it would be no contest of a choice:—it would choose to do without the phone lines hands down.

To return to the example bank, it has a central server for this sprawling network located at a single site. This server is attended to by about ten (10) operators (for comparison, the bank has tens of thousands of employees). A large part of the time of these operators is spent entering in user accounts and passwords for new employees, or deleting user accounts and passwords for departing employees. Given this network, the bank has moved to install a protected premise panel 32 as in accordance with the invention, on each of its 1000 or more ATM machines. The primary communication path(s) allowed for use of message transmission by these 1000 or so new panels 32, is of course over the bank's existing private data network. Plugging in 1000 new panels 32 did not require the bank to physically expand its data network by one line or cable. The 1000 or so new panels integrated on the network without slowing by any practical measure the existing business traffic over the network.

More significantly, the central receiver did not require physical expansion to include a 1000 matching terminals or a 1000 dedicated microprocessors. All that was required at the central receiver was loading the host with a modest software package that allowed processing of the automatic alarm messages, including routines to handle "Next Check-in" message traffic. The host did not require neither an upgrade in processor power nor an enlargement of memory. Whereas this particular host is relatively a powerful server, on the other hand it certainly is no mini-computer. It is nearly as compact as most desk-top computers. It is an inventive aspect of the alarm-path supervision system 30 in accordance with the invention that it loads seamlessly onto such a kind of host computer. That is to say, the memory requirements for storing the above-described Host Output Specification System Table, are modest at least (and perhaps no more a tiny fractional percentage of the rated memory of the Host as whole) when considering that Table in its entirety is only as big as about 1000 records.

Therefore, the experience of this bank is that it added 1000 premise-monitoring alarm systems at remote locations across the whole country without doing any of the following:—ie., (i) without physically enlarging its network by one phone line or cable, (ii) without enhancing its receiver equipment with new terminals or peripheral microprocessor banks, (iii) without increasing its host's processing power, and (iv) without expanding its host's memory.

Just as significant, the bank did not have to add one single new staff person in the operator-manager group attending to the host by reason of the new stream of automatic alarm data across the network. The routine(s) that operate the Host Output Specification System Table operate so virtually maintenance free. No longer is there any need for continual data entry and manipulation and flagging as is characteristic of the prior art "receiver-polling" systems. The bank plans to handle as much of the alarm signals internally as practicably possible. That is, the bank plans to dispatch its own employees or contractors to inspect in the first instance any ATM machine which has sent an alarm signal or otherwise caused an alert signal.

To conclude, the advantages over the prior art of the communication path supervision system 30 in accordance with the invention include the following. If deployed on a data network it has cut telephone line traffic in half because only the backup (or secondary) communication path makes use of the telephone line. That is, the primary communication path extends over the data network while only the back-up line still extends over the PSTN. During the day, when a great fraction of the alarm messaging is transpiring in the random value mode, the protected premise panels 32 are establishing communication transmissions far less frequently than six (6) minute intervals. Thus there is scaled back traffic over the data network, and correspondingly there is scaled back traffic into the receiving equipment 34 as a result of the random value mode. Hence the alarm messaging traffic may not represent anything but a minuscule percent of the total traffic over the data network, such that the alarm messaging traffic does not tax the data network's capacity by any practical measure.

Additionally, the central alarm monitoring station (or its receiving equipment 34) does not have to be specifically configured as to "who" or "exactly which" subscriber(s) are on the network. Each protected premise panel 32 is self-empowered to take itself off the network by transmitting a Next Check-In Message of zero (0). Re-establishing itself on the network is as comparably simple. After a long dormancy, any panel 32 merely needs to transmits a non-zero original Next Check-In Message, and it is on-line as far as concerns the Host Output Specification System Table.

Also, the central alarm monitoring station does not need to store or "know" the path or paths (e.g., including associated addresses or phone numbers or electronic serial numbers of cellular transceivers) to access a given panel 32. Each panel 32 is responsible for establishing the communication path, and each panel 32 will store more than one path so it can transmit over alternate paths if a primary path or network should fail.

These and additional aspects and objects of the invention will now be apparent given the foregoing discussion, including without limitation the aspect that the invention 30 greatly scales down the complexity of readying the receiving equipment 34 and/or the associated host automation system at the central alarm monitoring station.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of communication path integrity supervision for a network system of automatic alarm data communication, comprising the steps of:

provide a network of communication paths;

providing a plurality of automatic alarm data transmitters on the network for transmitting alarm messages;

providing at least one receiver on the network for receiving the message traffic of the transmitters; and, establishing a protocol between the receiver and the transmitters which achieves supervision of communication path integrity;

configuring the protocol on the transmitter-side to utilize processing circuitry and software for self-empowering any given transmitter to periodically test its ability to establish communication with the receiver by having a given transmitter:

generating a message of a next-appointed "check-in" time;

transmitting such message of a next-appointed "check-in" time to the receiver; and, monitoring the elapse of time so that before the expiration of the "next-appointed check-in time" the given transmitter returns to the above step of generating a message, hence generating a succeeding message of a successor "next-appointed check-in time;"

configuring the protocol on the receiver-side to utilize processing circuitry and software for organizing the "check-in" message traffic from the transmitters in an appointment schedule by having it, the receiver:
  for each received "check-in" message, scheduling or rescheduling an appointment in the appointment schedule for this transmitting transmitter for a next-appointed "check-in" time corresponding to this received "check-in" message; and
  monitoring concurrently the appointment schedule against the passage of time for any occurrence of an unmet appointment, which signifies problems with integrity.

2. The method of communication path integrity supervision of claim 1 wherein generally each transmitter is associated with a protected premise and is combined with circuitry including alarm-event sensors for generating messages responsive to detection of alarm events.

3. The method of communication path integrity supervision of claim 1 wherein each transmitter includes means for encoding the "next-appointed check-in" message with a time factor that corresponds to the timeliness of the reception due of the successor next-appointed check-in message for that transmitter.

4. The method of communication path integrity supervision of claim 3 wherein the time factor includes both a set of values signifying intervals of time as well as a null factor signifying that the transmitting transmitter checks off from the system, and hence thereby nullify the receiver-side monitoring thereof as applied to that particular transmitter.

5. The method of communication path integrity supervision of claim 1 wherein the receiver-side monitoring step further includes responding to instances when any transmitter fails to meet its scheduled or rescheduled next-appointed check-in, with an alert signal.

6. The method of communication path integrity supervision of claim 1 wherein the diverse communication paths comprise one of a substantially homogenous network of cables, a substantially homogenous network of radio links, or a conglomerate network including both cables and radio links.

7. The method of communication path integrity supervision of claim 1 wherein the appointment schedule for the receiver is configured in memory of the processing circuitry therefor with a table data structure for tabulating transmitters against their next scheduled check-in appointment.

8. A method of communication path integrity supervision for a network system of automatic alarm data communication, comprising the steps of:
  providing a network of communication paths;
  providing a plurality of automatic alarm data communicators for dispatching alarm messages and linking the communicators onto the network;
  providing at least one receiver on the network for receiving the message traffic of the communicators; and,
  establishing a protocol between the receiver and the communicators which achieves supervision of communication path integrity;
  configuring the protocol on the communicator-side to utilize processing circuitry and software for self-empowering any given communicator to periodically test its ability to establish communication with the receiver by having a given communicator:
    generating a message of a next-appointed "check-in" time;
    dispatching such message of a next-appointed "check-in" time to the receiver; and,
    monitoring the elapse of time so that before the expiration of the "next-appointed check-in time" the given communicator returns to the above step of generating a message, hence generating a succeeding message of a successor "next-appointed check-in time;"
  configuring the protocol on the receiver-side to utilize processing circuitry and software for organizing the "check-in" message traffic from the communicators in an appointment schedule by having it, the receiver:
    for each received unscheduled "check-in" message, establish an appointment record for the dispatching communicator in the appointment schedule and schedule that communicator for a next-appointed "check-in" time corresponding to that received "check-in" message;
    for each timely-received scheduled "check-in" message, update the appointment record for that particular communicator in the appointment schedule and reschedule it for a succeeding next-appointed "check-in" time corresponding to that particular received "check-in" message; and
    monitoring concurrently the appointment schedule against the passage of time for any occurrence of an unmet appointment, and if so then generating an "alert;"
  whereby such an "alert" signifies that a certain communicator failed to communicate a timely "check-in" message, which presumptively indicates that such certain communicator would likely have problems communicating alarm messages as well and hence requires further attention.

9. The method of communication path integrity supervision of claim 8 wherein generally each remote communicator is associated with a protected premise and is combined with circuitry including alarm-event sensors for generating data responsive to detection of alarm events.

10. The method of communication path integrity supervision of claim 8 wherein each remote communicator includes means for encoding the "next-appointed check-in" message with a time factor that allows receiver-side monitoring for the appointed time by which reception is due for the succeeding next check-in from that communicator.

11. The method of communication path integrity supervision of claim 10 wherein the time factor includes both a set of values signifying intervals of time as well as a null factor signifying that the sending communicator checks off from the system, and hence thereby nullify the receiver-side monitoring as applied to that particular communicator.

12. The method of communication path integrity supervision of claim 11 wherein the step of communicator-side monitoring is configured to dispatch each succeeding "next-appointed check-in" message about a minute before such lapse of the interval of time that was signified by the preceding "next-appointed check-in" message.

13. The method of communication path integrity supervision of claim 8 wherein the appointment schedule for the at least one receiver is configured in memory of the processing circuitry therefor with a table data structure for tabulating communicators against their next-appointed check-in times.

14. A method of communication path integrity supervision for a network system of automatic alarm data communication, comprising the steps of:
  providing a network of communication paths;
  providing a plurality of automatic alarm transmitters on the network for messaging alarm data;
  providing at least one receiver on the network for receiving the message traffic of the transmitters; and, configuring any transmitter participating in said method of communication path integrity supervision to utilize processing circuitry and software for self-empowering that transmitter to periodically test its ability to establish communication with the receiver by having that transmitter:

generating a message of a next "check-in" time;

transmitting such message of a next "check-in" time to the receiver; and, monitoring the elapse of time so that before the expiration of the "next check-in time" the given transmitter returns to the above step of generating a message, hence generating a succeeding message of a successor "next check-in time;"

configuring the receiver to utilize processing circuitry and software for organizing the "check-in" message traffic from the transmitters in the receiver's memory by having it, the receiver:

for each received "check-in" message, entering a record or updating the record for that transmitting transmitter in the receiver's memory of the next due "check-in" time, which corresponds to the received "check-in" message; and monitoring concurrently the records in the memory against the passage of time for any occurrence of a tardy next "check-in" message, and if so then generating an "alert" which signifies that presumptively a certain transmitter is likely having problems communicating over the network and hence requires further attention.

15. The method of communication path integrity supervision of claim 14 wherein generally each transmitter is associated with a protected premise and is combined with circuitry including alarm-event sensors for generating data responsive to detection of alarm events.

16. The method of communication path integrity supervision of claim 14 wherein the step of generating a message of a next "check-in" time further comprises plural modes for automatically generating the next "check-in" message, such that one mode causes generation of regularly spaced time intervals and that the other mode causes generation of randomly chosen time intervals ranging between a value greater than zero and a larger value which is finite.

17. The method of communication path integrity supervision of claim 14 wherein the memory for the at least one receiver is configured with a table data structure for tabulating transmitters against their next due check-in.

\* \* \* \* \*